Figure 4:
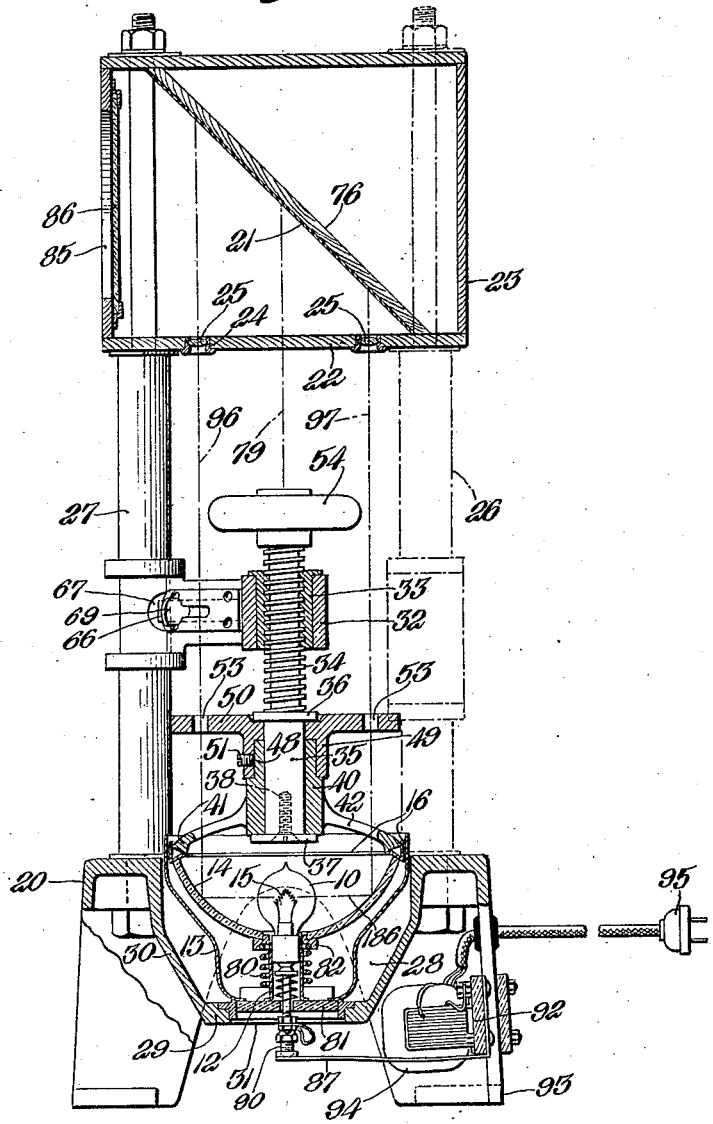

May 7, 1929.   C. H. KELSEA   1,712,147
METHOD OF AND APPARATUS FOR MAKING PROJECTOR UNITS
Filed March 30, 1926   3 Sheets-Sheet 1
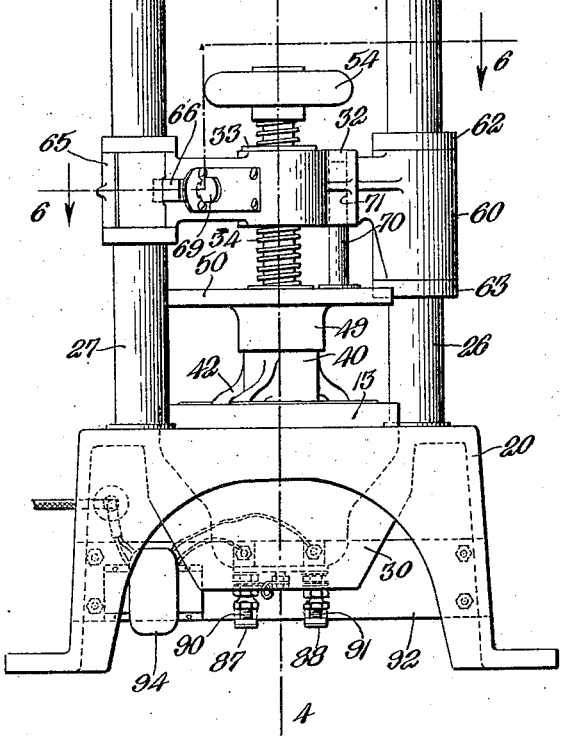
INVENTOR.
Clarence H. Kelsea
BY Jas. H. Churchill
ATTORNEY May 7, 1929.　　　　C. H. KELSEA　　　　1,712,147
METHOD OF AND APPARATUS FOR MAKING PROJECTOR UNITS
Filed March 30, 1926　　　3 Sheets-Sheet 2

INVENTOR.
Clarence H. Kelsea
BY
Jas. H. Churchill
ATTORNEY.

May 7, 1929. C. H. KELSEA 1,712,147
METHOD OF AND APPARATUS FOR MAKING PROJECTOR UNITS
Filed March 30, 1926 3 Sheets-Sheet 3

INVENTOR.
Clarence H. Kelsea
BY Jas. H. Churchill
ATTORNEY.

Patented May 7, 1929.

1,712,147

UNITED STATES PATENT OFFICE.

CLARENCE H. KELSEA, OF BELMONT, MASSACHUSETTS, ASSIGNOR TO PETER GRAY & SONS, INC., OF CAMBRIDGE, MASSACHUSETTS, A CORPORATION OF MASSACHUSETTS.

METHOD OF AND APPARATUS FOR MAKING PROJECTOR UNITS.

Application filed March 30, 1926. Serial No. 98,633.

This invention relates to a method of and apparatus for making projector units with the reflector and the light source or filament of an incandescent lamp accurately positioned with relation to each other with the focus of the reflector in a plane passing through the center of the filament, whereby a projector unit of maximum illuminating efficiency may be obtained and whose efficiency is prevented from being diminished by unauthorized persons.

To this end the parts of the projector unit are assembled and arranged with relation to a target so as to project rays of light toward said target, and an intercepter for light rays is interposed between the projector unit and said target and is provided with one or more relatively small openings arranged with their axes parallel with the longitudinal axis of the reflector of the projector unit and adapted to form one or more small beams of light from portions of the rays projected by said unit, which small beams of light are projected upon the target and are moved into a position in which they are parallel with the longitudinal axis of the reflector of said projector unit, as will be described.

The openings in the intercepter may and preferably will be provided with concentrating lenses, for a purpose as will be described. Preferably a main and an auxiliary intercepter will be employed, as will be described.

The movement of the small beam of light on the target may and preferably will be effected by moving the reflector in its housing with relation to the light source, which is preferably fixed in the housing and non-adjustable therein.

The reflector may be moved by a device interposed between the target and a supporting member for the projector unit.

In the present instance, the supporting member for the projector unit, the target, intercepter and the device for moving the reflector are arranged to form a portable apparatus as will be described.

These and other features of this invention will be pointed out in the claims at the end of this specification.

Figure 5:
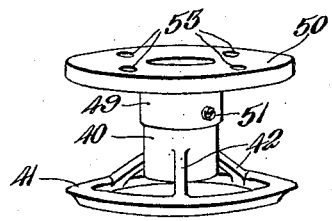

Fig. 1 is a front elevation of one form of apparatus with which the improved method may be practised;

Figs. 2 and 3, diagrammatic views illustrating the images produced on the target with the reflector in its improper and proper positions, respectively;

Fig. 4, a vertical section on the line 4—4, Fig. 1;

Fig. 5, a detail in elevation of the device for positioning the reflector, and

Figure 6:
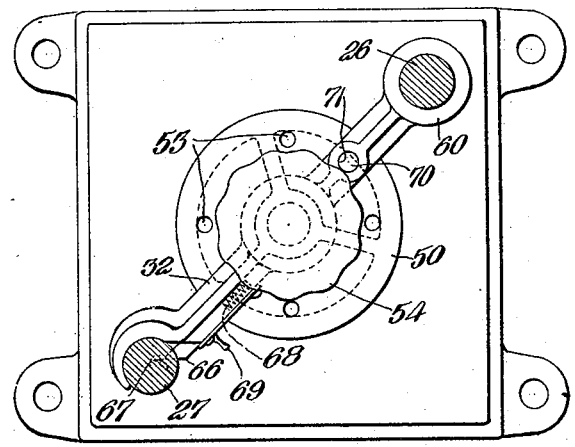

Fig. 6, a section on the irregular line 6—6, Fig. 1.

In the present instance is shown a portable apparatus with which a projector unit may be made by my improved method.

The parts of the projector unit are represented in Fig. 4 and comprise an incandescent lamp 10 of the so-called " precision " type, a socket 12 for said lamp, a housing 13 to the rear end of which the lamp socket is fixed, and a reflector 14 which is initially movable in the housing 13 with respect to the fixed lamp socket to adjust and accurately position its focus in a plane passing through the center of the filament 15 of the lamp 10, and which when thus positioned or adjusted is secured in fixed relation to the housing and in non-adjustable relation to the lamp socket, as herein shown, by a retaining member or ring 16, which is soldered or otherwise fastened to the housing 13.

The apparatus is provided with a member 20 for supporting the projector unit, with a target 21 opposing the reflector 14 of said unit, and with an intercepter for light rays from the projector unit.

The intercepter in the present instance is formed by the bottom 22 of a box 23 containing the target. The intercepter 22 is provided with one or more relatively small openings 24, preferably four in number and located substantially 90° apart. The openings 24 have co-operating with them concentrating lenses 25. The box 23 is erected upon columns 26, 27 diagonally arranged on the base 20.

The base 20 herein shown is provided in its upper surface with a substantially central circular opening, which forms the mouth of a chamber 28 located within the base 20 and provided with a bottom wall 29 and with a substantially circular side wall 30. The bottom wall 29 is located above the bottom of the base and at the proper distance below the upper surface thereof to provide the chamber 28 with sufficient depth to receive substantially the whole of the projector unit, as represented in Fig. 4, and is provided with an opening 31.

One of the columns as 26 has mounted on it to swing thereon, a lever or swing arm 32 which carries an internally threaded bushing 33 (see Fig. 4) through which is extended the threaded upper portion 34 of a spindle or rod 35 provided with a fixed collar 36 and with a removable collar 37, the latter being formed by a disk which is secured to the lower end of the spindle or rod 35 by a screw 38 (see Fig. 4).

The spindle or rod 35 between the collars 36, 37 is smooth and has mounted thereon a hub 40 having a ring or annular member 41 connected therewith by spokes or arms 42. The ring 41 is designed to engage the retaining ring 16, which is soldered or otherwise fastened to the said housing when the reflector 14 has been properly positioned in the housing, as will be described. A disk 50 is preferably attached to the hub 40, the latter having a reduced portion 48 on which is fitted the hub 49 of the disk 50, and fastened thereto by a screw 51.

The disk 50 is made large enough to intercept light rays projected upwardly by the reflector 14 and constitutes an auxiliary intercepter, and is provided with relatively small openings 53 extended through it and arranged in line with the openings 24 in the intercepter 22.

The ring 41 and the disk 50 are capable of being moved vertically by turning the handle 54 fast on the spindle or rod 35, and are also capable of being moved laterally by turning the swing arm 32 on the column 26.

As herein shown the swing arm 32 is provided at one end with a hub 60 (see Fig. 1), which is mounted on the column or rod 26 between collars 62, 63 thereon. The opposite end of the swing arm 32 is provided with a substantially semicircular hook 65 to engage the column 27 (see Fig. 6), and said swing arm is locked to said column by a bolt 66 slidably mounted on the swing arm and designed to enter a socket 67 in said column.

The bolt 66 is held in the socket 67 by a spring 68 (see Fig. 6), and is provided with a thumb piece 69 by which it may be withdrawn from its socket, when it is desired to turn the swing arm laterally and move the ring 41 and disk 50 from above the chamber 28 and thereby enable the projector unit to be inserted into the chamber and removed therefrom.

Provision is made for preventing the disk 50 from rotating while it is being moved vertically, and to this end, the said disk has erected upon its upper surface a pin 70 which is movable in a bore or opening 71 extended through the swing arm 32 (see Figs. 1 and 6).

The disk 50 intercepts light rays projected upwardly from projector unit and allows portions of the light rays to pass through the holes or openings 53 therein.

These rays are projected against the bottom 22 of the box 23 and most of them are intercepted thereby. A limited portion of the rays of light which strike the bottom 22 pass through the lenses 25, and passing through the same are concentrated by the lenses and projected upon the target 24 to form thereon small images of the filament 15 of the lamp 10. The target may be a piece of white paper suitably affixed to an inclined wall 76 within the box or casing.

The target 21 is provided with radial lines 77 and with lines 78 at right angles thereto and tangent to the same circle.

The center of the openings 24, 53 in the intercepters 22, 50 are equidistant from the longitudinal axis of the reflector, which axis is indicated by the line 79 in Fig. 4.

The reflector 14 is yieldingly supported by a spring 80 encircling the lamp socket and bearing against the rear wall 81 of the housing and against a bearing ring 82 for the reflector.

Provision is made for connecting the lamp socket 12 in a lighting circuit, and for this purpose, circuit terminals 87, 88 are arranged in line with the opening 31 in the bottom of the chamber 28 and so as to be engaged by the terminals 90, 91 of the lamp circuit, so that when the housing 13 of the projector unit is positioned in the chamber 28, the lamp 10 will be lighted.

The circuit terminals 87, 88 preferably will be made of strips of copper or other metal, which are secured to an insulating support, preferably a bar 92 secured to two of the legs 93 on the base 20.

The bar 92 may also support a small transformer 94, whose leads are connected with a plug contact 95 adapted to be connected in a lighting circuit.

When the apparatus is not in use, the swing arm 32 is turned so as to uncover the chamber 28, which enables the operator to place in said chamber, the housing 13 of the projector unit, which contains the fixed lamp socket 12, and its lamp 10, the reflector 14 which is movable in the housing and rests on the spring 80 and the retaining ring 16 which is also loose and movable in the housing.

When the projector unit has been placed in the chamber 28, as described, the axis of the reflector is coincident with the center of the target and equidistant from lines 96, 97 passing through the center of the openings 53, 24.

The operator now turns the swing arm 32 into engagement with the column 27 so as to bring the ring 41 above the housing and into position to enter the latter and engage the retaining ring 16. The swing arm 32 is locked in its operative position by the bolt 66.

The circuit of the lamp 10 is then completed by means of the plug 95 and the lamp 10 is lighted.

The main portion of the light rays is intercepted by the disk 50 and only a small portion thereof passes through the openings 53 and strikes against the intercepter 22, and those rays which strike the lenses pass through the same and are concentrated thereby upon the target 21 and in the present instance form on the target four images of the filament of the lamp located 90° apart.

These images are represented in Figs. 2 and 3 by the small circles 100. When the reflector is placed in the housing, it is out of focus with respect to the filament of the lamp, and this is indicated on the target by the images of the filament falling to one side of the points of intersection of the lines 77, 78 as represented in Fig. 2.

The operator by turning the hand wheel 54 in one direction causes the ring 40 to move the reflector toward the lamp 10 against the pressure of the spring 80, until the small circles 100 are centrally positioned on the target with relation to the points of intersection of the lines 77, 78, as represented in Fig. 3.

If the reflector 14 is moved too far, which is made known by the images of the filament appearing on the target within the circle represented by the points of intersection of the lines 77, 78, the operator turns the handle 54 in the opposite direction, which allows the spring 80 to move the reflector away from the lamp. By manipulating the handle 54, the reflector 14 is soon adjusted into its proper position and accurately positioned with relation to the light center of the lamp with its focus in a plane passing through the center of the filament.

When the reflector is properly positioned or adjusted with relation to the lamp, it is then secured in fixed relation to the housing, which is preferably effected by means of a soldering tool (not shown), which can be inserted into the housing and engaged with the retaining ring 16 so as to solder the latter to the housing preferably at a plurality of points about the circumference of said ring.

When this is done, the hand wheel 54 is turned to withdraw the ring 41 from the housing, and the swing arm 32 is unlatched from the column 27 and swung outwardly about the column 26 so as to uncover the projector unit and allow it be removed.

The hooked end 65 of the swing arm is arranged to engage the column 27 when the ring 41 is centrally located with relation to the housing.

The box or casing 23 is provided in its front end with a sight opening 85 covered by a plain glass 86 through which the target is visible to the operator.

It will be observed that by intercepting the greater part of the light rays projected by the reflector and allowing only a small portion of the rays to be projected onto the target, a small and sharp or well-defined image of the filament is obtained on the target, which can be accurately positioned with relation to the points of intersection of the lines 77, 78, which points of intersection are in planes or lines parallel with and equidistant from the longitudinal axis of the reflector. When the images are thus positioned on the target, which can be observed by the operator looking through the sight glass 86, the focus of the reflector is in a plane 186 through the center of the filament or light source, and a projector unit of maximum illuminating efficiency is obtained.

Furthermore in such projector unit, the reflector and the light source may be in non-adjustable relation to each other and in fixed or immovable relation to the housing and therefore are not subject to derangement by unauthorized persons.

The apparatus is particularly useful for making new projector units, but it is also useful in testing the accuracy of lamps which are placed in projector units assembled with the aid of the apparatus and in which the reflectors and the lamp sockets are fixed to the housing and are non-adjustable with relation thereto or to each other.

It is also preferred to use the auxiliary intercepter 50, but this can be omitted, and the main intercepter 22 used alone.

It is also preferred to use a plurality of openings in the intercepter, but a single opening may be used. Furthermore it is preferred to make the opening or openings of substantial size and use therewith a concentrating lens, which will gather the light rays and bring them to substantially a point on the target, but it is not desired to limit the invention in this respect, as a very small opening like a pin point may be used without the concentrating lens.

A preferred construction of apparatus is herein shown, but it is not desired to limit the invention to the particular construction shown.

What is claimed is:

1. The method of making projector units having a housing, a light source and a reflector initially movable in said housing with respect to said light source and secured in its adjusted position in integral relation to said housing and in non-adjustable relation to said light source, which consists in arranging the projector unit in position to project rays of light on a target, interposing between the projector unit and said target an intercepter for the major portion of the light rays projected by said unit and having a relatively small opening for forming a small beam of light from a portion of the light rays projected by said unit, moving said reflector in said housing with relation to said light source into a position wherein said relatively small beam is substantially parallel with the longitudinal axis of said reflector, and securing the reflector in integral relation to said housing and against movement with respect to said light source with said small beam in its parallel relation to said axis.

2. The method of making projector units having a housing, a lamp socket in integral relation to said housing, a lamp in said socket provided with a filament, and a reflector initially movable in said housing with respect to said lamp and secured in its adjusted position in integral relation to said housing and in nonadjustable relation to said lamp, which consists in arranging the projector unit in position to project rays of light on a target with the reflector in its initially movable condition, interposing between the projector unit and said target and in the path of the rays of light projected by said unit an intercepter for the major portion of said light rays having a relatively small opening for forming a small beam of light, which projects upon the target a relatively small image of the lamp filament, moving said reflector in said housing with respect to said lamp into a position wherein the relatively small beam is substantially parallel with the longitudinal axis of the reflector and the focus of the reflector is in a plane passing through substantially the center of the filament, and securing the reflector in integral relation to said housing and against movement with relation to said filament with said small beam in its parallel relation to said axis.

3. In an apparatus of the character described, in combination, a base having a chamber for the reception of a projector unit, columns erected upon said base, a target-containing box supported by said columns and provided with openings in its bottom for the passage of light rays from said projector unit, a swing arm mounted to turn on one of said columns, a spindle having a threaded engagement with said swing arm, a presser member for engaging the reflector of said projector unit mounted on said spindle, a disk for intercepting light rays, said disk being connected with said presser member to move therewith and provided with openings for the passage of light rays from said projector unit, and means for securing said swing arm to the other of said columns with the openings in said disk substantially in alignment with the openings in said box.

4. In an apparatus of the character described, in combination, a base having a chamber for the reception of a projector unit and provided with an opening in its bottom for the passage of circuit terminals of said projector unit, circuit terminals supported by said base in line with said opening to be engaged by the circuit terminals on said projector unit, columns erected upon said base, a target-containing box supported by said columns and provided with openings in its bottom for the passage of light rays from said projector unit, a swing arm mounted to turn on one of said columns, a spindle having a threaded engagement with said swing arm, a presser member for engaging the reflector of said projector unit mounted on said spindle, a disk for intercepting light rays, said disk being connected with said presser member to move therewith and provided with openings for the passage of light rays from said projector unit, and means for securing said swing arm to the other of said columns with the openings in said disk substantially in alignment with the openings in said box.

5. In an apparatus of the character described, in combination, a base to support a projector unit provided with a light source and a reflector, a presser member for engaging the reflector of said projector unit on opposite sides of the longitudinal axis of said reflector, a supporting member for said presser member movable laterally with relation to said base, and a threaded spindle carried by said supporting member and to which said presser member is secured to be moved toward and from said base by rotation of said spindle.

6. In an apparatus of the character described, in combination, a base to support a projector unit provided with a light source and a reflector, a presser member for engaging the reflector of said projector unit, a supporting member for said presser member movable laterally with relation to said base, a threaded spindle carried by said supporting member and to which said presser member is secured to be moved toward and from said base by rotation of said spindle, and a light intercepter mounted on said spindle above said presser member and provided with an opening for the passage of a portion of the said light rays.

7. In an apparatus of the character described, in combination, a base to support a projector unit provided with a housing, a light source, and a reflector initially movable in said housing with respect to the said light source, a rotatable spindle located above said base, a supporting member for said spindle movable laterally with relation to said base, a presser member carried by said spindle and co-operating with said reflector to adjust it with relation to said light source and a light-intercepting member mounted on said spindle to be moved toward and away from said base by rotation of said spindle and co-operating with said reflector to intercept a portion of the light rays projected by said reflector.

8. In an apparatus of the character described, in combination, a base to support a projector unit provided with a housing, a light source and a reflector initially movable in said housing with respect to said light source, a presser member for engaging the reflector of said projector unit on oppoosite sides of the longitudinal axis of said reflector to move the latter toward said light source, and means carried by said base for supporting said presser member to enable the latter to be moved laterally of said base to enable the projector unit to be positioned thereon and to be moved toward said base to move the said reflector toward said light source and said base.

9. In an apparatus of the character described, in combination, a base to support a projector unit, a target erected upon said base, a reflector-engaging member between said target and base and movable toward and from said base and laterally thereof, a light intercepter between said target and base and provided with an opening for the pasage of light rays from the projector unit to said target.

10. In an apparatus of the character described, in combination, means for supporting a projector unit having a filament and a reflector, a target opposed to said projector unit, and an intercepter interposed between said projector unit and said target and provided with a relatively small opening to form a relatively small beam of light from the portion of the light rays projected by said unit which pass through said opening and which project upon the target an image of said filament.

In testimony whereof, I have signed my name to this specification.

CLARENCE H. KELSEA.